F. E. DAVIS & W. W. CAMERON.
PLOW.
APPLICATION FILED SEPT. 8, 1913.
1,199,055.
Patented Sept. 26, 1916.
2 SHEETS—SHEET 2.
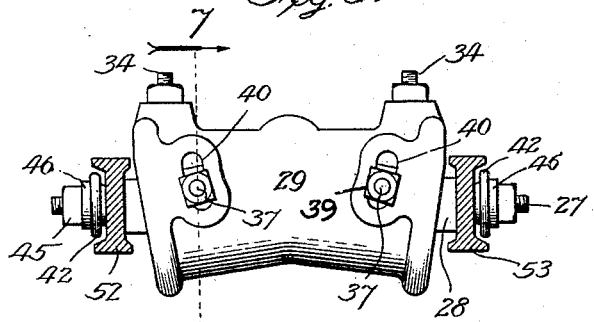
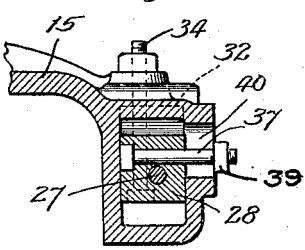
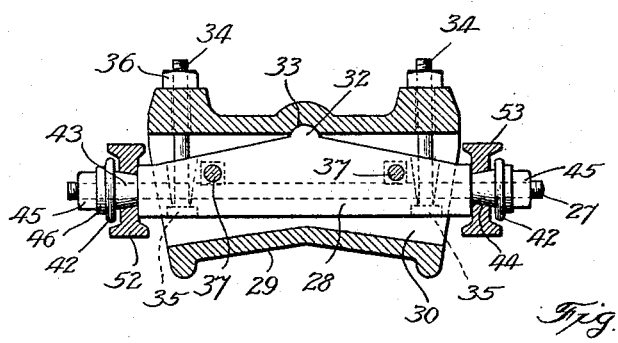
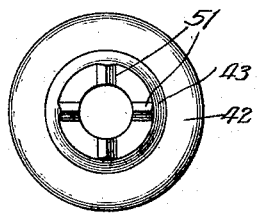
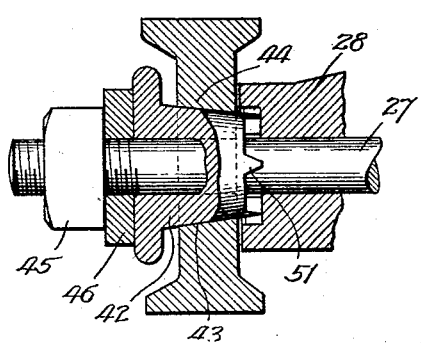
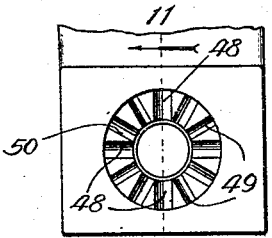
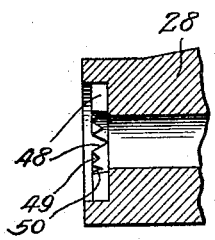

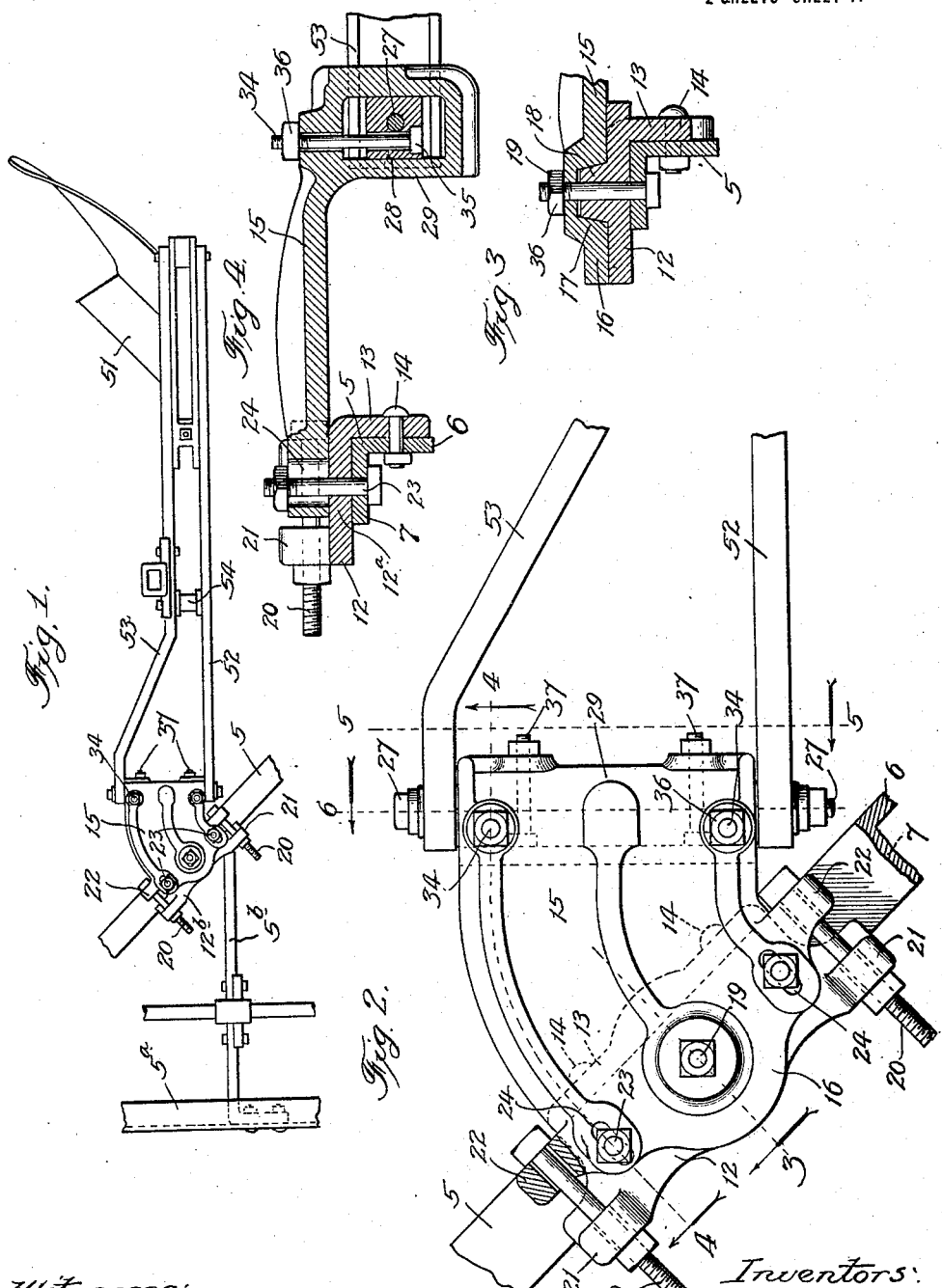

UNITED STATES PATENT OFFICE.

FRANK E. DAVIS AND WILLIAM W. CAMERON, OF LA CROSSE, WISCONSIN, ASSIGNORS TO LA CROSSE PLOW COMPANY, OF LA CROSSE, WISCONSIN, A CORPORATION OF WISCONSIN.

PLOW.

1,199,055.     Specification of Letters Patent.     Patented Sept. 26, 1916.

Application filed September 8, 1913. Serial No. 788,547.

*To all whom it may concern:*

Be it known that we, FRANK E. DAVIS and WILLIAM W. CAMERON, both residents of La Crosse, in the county of La Crosse and State of Wisconsin, have invented new and useful Improvements in Plows, of which the following is a full, clear, and exact description.

The invention relates to plows and more particularly to devices for pivotally connecting the plow-carrying beam to the tractor or supporting frame.

The invention designs to provide an improved adjustable coupling for the plow beam which permits the plow beam to be adjusted laterally and effect proper spacing between the plows of a gang.

The invention further designs to provide improved coupling means for the plow beam which permits the plow body to be angled laterally or leveled.

The invention further designs to provide an improved pivotal connection between the plow beam and the coupling whereby it is connected to the frame.

The invention consists in the several novel features hereinafter set forth and more particularly defined by claims at the conclusion hereof.

In the drawings: Figure 1 is a plan of a portion of a tractor plow embodying the invention. Fig. 2 is an enlarged plan of the improved coupling for the beam. Fig. 3 is a section taken on line 3—3 of Fig. 2. Fig. 4 is a section on line 4—4 of Fig. 2. Fig. 5 is a section taken on line 5—5 of Fig. 2. Fig. 6 is a section taken on line 6—6 of Fig. 2, the spacing bar between the beam members being shown in elevation. Fig. 7 is a section taken on line 7—7 of Fig. 5. Fig. 8 is a detail, vertical, transverse section showing one side of the pivotal connection between the beam and the coupling. Fig. 9 is a detail view of the adjusting collar. Fig. 10 is a detail view of the spacing bar between the members of the plow beam. Fig. 11 is a section on line 11—11 of Fig. 10.

The tractor frame comprises a diagonal bar 5 which is made of angle iron and comprises a vertical flange 6 and a top flange 7. The several couplings for the plows, respectively, are each secured to this diagonal bar in properly spaced relation, as well understood in the art, and the diagonal bar is secured to the front rail 5ª of the frame by suitable means including a longitudinal bar 5ᵇ.

The plow beam, to which a plowshare 51 may be secured in any suitable or usual manner, comprises two members 52 and 53 which are usually formed of wrought metal and are suitably spaced apart by a block 54 so their front ends will embrace, or be disposed at the sides of, the coupling whereby the beam is pivotally connected to the frame.

The coupling between the front end of the plow beam and the frame bar 5 comprises a bracket 12 which has a horizontal portion 12ª which fits on the top of bar 5, and a downwardly extending portion 13 fitting against the side of flange 6 of said bar. Bracket 12 is rigidly secured to bar 5 by bolts 14 which extend through portion 13 of the bracket and through the flange 6 of the diagonal frame bar. This bracket constitutes one member of a two-part coupling for the beam, and provides means on the frame to which the other member 15 of the coupling may be secured to the frame. Coupling member 15 comprises a flat portion 16 which fits on the top of bracket 12 and is provided with a tapered socket 17 which fits around a correspondingly shaped projecting lug 18 on the top of bracket 12 to pivotally connect member 15 and bracket 12, and to pivotally connect the members of the coupling. This pivotal connection is provided between the coupling members 12, 15 to permit the plow beams to be adjusted laterally to properly space them from one another or to give the landside the correct angle with respect to the draft. A bolt 19 extends through lug 18 of bracket 12, member 15 and the top flange of bar 5 to hold the member 15 on bracket 12. The pivotal connection between member 15 and bracket 12 is centrally disposed and a draw-bolt 20 is provided at each side of said pivot so that, by loosening one and tightening the other, coupling member 15 may be accurately adjusted to correspondingly adjust the beam. At each side, bracket 12 is provided with a perforated lug 21 and member 15 is provided with a perforated lug 22 for the bolts 20, respectively.

At each side of the pivotal connection between bracket 12 and coupling member 15 a bolt 23 extends through the top flange of bar 5, the top of bracket 12 and through a slot 24 in member 15. These bolts 23 serve to clamp bracket 12 and coupling 15 together and to secure them firmly to the top of bar 5, slots 24 permitting adjustment of member 15 about its pivotal connection with bracket 12 by means of bolt 17. This construction of coupling and the adjustable connection between the members thereof provide for adjustment and firm securement between the coupling and the frame bar.

The pivotal connection between the front end of the beam and the coupling comprises a pin or bolt 27 which is held in a bearing member 28 which is adjustably connected to the coupling member 15. The rear end of the latter is formed into a housing 29 having an opening 30 extending transversely therethrough. Bearing member 28 fits snugly between the front and rear walls of housing 29 and carries the pivot pin 27 to which the plow beam is connected to swing vertically, so it can be raised out of, or lowered into, the soil. In practice, lateral adjustment of the plow beam is desirable to give the proper angle to or to level the plow body transversely, and for this purpose an adjustable connection is provided whereby the plow beam, pin 21 and bearing 28 may be angularly and vertically adjusted. This adjustable connection comprises a lug 32 centrally disposed on the top of bearing member 28 which fits into a seat 33 in the top wall of housing 29, the lug and seat being formed to permit member 28 to move pivotally in the housing, and draw-bolts 34, one at each side of said pivotal connection. Each of these draw-bolts has a head 35 which is countersunk in the bottom of member 28, extends upwardly through said member, and through the top wall of housing 29. By releasing the nut 36 at the upper end of one of these draw-bolts 34, and taking up the other, the bearing member may be adjusted into the desired angular position to properly level or angle the plow-body. Bolts 37 have heads which are countersunk in the front of bearing member 28, extend rearwardly through said members and through arcuate slots 40 in the rear wall of housing 29 and nuts 39 on said bolts are adapted to firmly clamp and lock the bearing member 28 in its assigned position in coupling member 15. This connection between the bearing member and the coupling provides means whereby the angle of the plow body may be readily varied to a nicety and whereby the bearing will be firmly secured to the coupling.

In practice, it is desirable to avoid lost motion at the pivotal connection about which the beam swings vertically, and one feature of the invention consists in providing means for this purpose. At each end of pin 27 a bearing-sleeve 42 is provided and this sleeve has a conoidal bearing surface 43 which fits in a correspondingly tapered opening 44 in the beam members 52, 53, respectively. Bearing member 28 fits between the front ends of beam members 52, 53, to space them apart and nuts 45 at the ends of pin 27 are adapted to clamp bearing sleeves 43 to member 28, a washer 46 being interposed between each nut 45 and sleeve 42. To provide for the adjustment of the bearing sleeves so that their bearing surfaces will fit snugly in the beam members, and to prevent the nuts from clamping the sleeves so that binding between the sleeves and the beam members will result, each end of bearing member 28 is provided with plural series of recesses 48, 49 and 50 of different depths, each series of recesses being adapted to receive a series of teeth or lugs 51 on the inner end of one of the bearing sleeves 42. By setting collar 42 so that its teeth 51 will pass into that series of notches in bearing member 28 which will cause sleeves 42 to be spaced so that the conical bearing surfaces in members 52, 53 will fit snugly around said sleeves, lost motion between the beam and its pivot will be effectively eliminated. If the bearing surfaces become worn, the sleeves, upon release of clamp nuts 45, may be turned to bring their teeth into a deeper series of notches in bearing member 28 to compensate for the wear. This connection between the beam and its pivot thus provides one which permits the lateral angle of the plow body to be effectively maintained and which overcomes lost motion at the pivotal connection for the beam.

The invention is not to be understood as restricted to the details set forth, since these may be modified within the scope of the appended claims without departing from the spirit and scope of the invention.

Having thus described our invention, what we claim as new, and desire to secure by Letters Patent, is:

1. In a plow, the combination of a frame, a plow beam, a plow carried by said beam, a coupling comprising two members disposed one above the other, one of which is secured to said frame and to the other of which the beam is pivotally connected, a pivotal connection between the members which permits one of them to be adjusted laterally, and bolts disposed on opposite sides of said pivot, respectively, for positively and laterally adjusting the member to which the beam is connected in opposite directions.

2. In a plow, the combination of a frame, a plow beam, a plow carried by said beam, a coupling comprising two members disposed one above the other, one of which is secured to said frame and to the other of which the beam is pivotally connected, the members being provided with an interfitting pivot lug and socket, respectively, to form a pivotal connection which permits one of the members to be adjusted laterally, and bolts disposed on opposite sides of said pivot respectively, for positively and laterally adjusting the member to which the beam is connected in opposite directions.

3. In a plow, the combination of a frame, a plow beam, a plow carried by said beam, a coupling comprising two members disposed one above the other, one of which is secured to said frame and to the other of which the beam is pivotally connected, a pivotal connection between the members which permits one of them to be adjusted laterally, bolts disposed on opposite sides of said pivot, respectively, for positively and laterally adjusting the member to which the beam is connected in opposite directions, and means for clamping the members together.

4. In a plow, the combination of a frame, a plow beam, a plow carried by said beam, a coupling comprising two members disposed one above the other, one of which is secured to said frame and to the other of which the beam is pivotally connected, a pivotal connection between the members which permits one of them to be adjusted laterally, bolts disposed on opposite sides of said pivot, respectively, for positively and laterally adjusting the member to which the beam is connected in opposite directions, and clamping bolts extending through both of said members and the frame.

5. In a plow, the combination of a frame, a plow beam, a plow carried by said beam, a coupling comprising two members disposed one above the other, one of which is secured to said frame and to the other of which the beam is pivotally connected, a pivotal connection between the members which permits the one to which the beam is connected to be adjusted laterally, lugs on opposite sides of the pivot on said members, respectively, and bolts extending through said lugs for positively and laterally adjusting one of the members in opposite directions.

6. In a plow, the combination of a frame, a plow beam, a plow carried by said beam, a coupling connected to the frame, a bearing, a pivotal connection between the central portion of the bearing and the coupling which permits the bearing to swing in a vertical plane, and adjusting bolts at the opposite sides of said pivotal connection, respectively, for positively adjusting the bearing, and a pivotal connection between the bearing and the beam.

7. In a plow, the combination of a frame, a plow beam, a plow carried by said beam, a coupling connected to the frame, a bearing, a pivotal connection between the bearing and the coupling which permits the bearing to swing in a vertical plane, adjusting bolts at the sides of said pivot, respectively, for positively adjusting the bearing, a pivotal connection between the bearing and the beam, and means for clamping the bearing to the coupling.

8. In a plow, the combination of a frame, a plow beam pivotally connected to the frame, a plow carried by said beam, a coupling connected to the frame comprising a housing having an opening extending transversely therethrough, a bearing slidably held in the housing, a central pivotal connection between the bearing and the housing which permits both ends of the bearing to be adjusted in a vertical transverse plane in the housing and means for securing the bearing in the housing.

9. In a plow, the combination of a frame, a plow beam pivoted to said frame, a plow carried by said beam, a coupling connected to the frame, comprising a housing having an opening extending transversely therethrough, a bearing in said housing, a pivotal connection between the central portion of the bearing and the housing which permits the bearing to be adjusted in a vertical transverse plane in the housing, and adjusting bolts for the bearing disposed at opposite sides of said pivotal connection.

10. In a plow, the combination of a frame, a plow beam pivotally connected to the frame, a plow carried by said beam, a coupling connected to the frame and extended to form a housing, a bearing in said housing, a pivot lug and seat between the bearing and housing which permit the bearing to be adjusted transversely, and means for adjusting the bearing in the housing.

11. In a plow, the combination of a frame, a plow beam, a plow carried by said beam, a coupling connected to the frame, comprising a housing having an opening extending transversely therethrough, a bearing in said housing, a pivotal connection between the bearing and the housing, which permits it to be adjusted in a vertical plane, means for adjusting the bearing in the housing, means for securing the bearing in the housing, and a pivotal connection between the bearing and the beam.

12. In a plow, the combination of a frame, a plow beam, a plow carried by said beam, a coupling connected to the frame, comprising a housing having an opening extending transversely therethrough, a bearing in said housing, a pivotal connection between the bearing and the housing, which permits it to be adjusted in a vertical plane, adjusting bolts for the bearing at the sides of said pivotal connection, means for securing the bearing in the housing, and a pivotal connection between the bearing and the beam.

13. In a plow, the combination of a frame, a plow beam, a plow carried by said beam, a coupling connected to the frame and extended to form a housing, a bearing in said housing, a pivot lug and seat between the bearing and housing, which permit the bearing to be tilting vertically, means for adjusting the bearing vertically, means for securing the bearing in the housing, and a pivotal connection between the bearing and the beam.

14. In a plow, the combination of a frame, a plow beam, a plow carried by said beam, a coupling connected to the frame and extended to form a housing, a bearing in said housing, a pivot lug and seat on the bearing and housing, respectively, which permit the bearing to be adjusted vertically, adjusting bolts at the sides of said pivotal connection between the bearing and the housing, respectively, extending through the top of the housing, and a pivotal connection between the bearing and the beam.

15. In a plow, the combination of a frame, a plow beam, a plow carried by said beam, a coupling comprising two members, one of which is secured to said frame and to the other of which the beam is pivotally connected, a pivotal connection between the members which permits one of them to be adjusted laterally, adjusting bolts at the sides of said pivot respectively for positively adjusting the member to which the beam is connected relatively to the frame, a housing on the latter member and a transversely adjustable bearing in said housing.

16. In a plow, the combination of a frame, a plow beam, a plow carried by said beam, a coupling comprising two members, one of which is secured to said frame and to the other of which the beam is pivotally connected, a pivotal connection between the members which permit one of them to be adjusted laterally, bolts disposed on opposite sides of said pivot, respectively, for positively adjusting the member to which the beam is connected, means for clamping the members together, the adjustable member comprising a housing, the pivotal connection between the beam and one of the members comprising a bearing centrally pivoted to tilt vertically and transversely in said housing, and means for tilting the bearing vertically in the housing.

17. In a plow, the combination of a frame, a plow beam, a plow carried by said frame, a coupling comprising two members, one of which is secured to said frame, the other of which is provided with a housing, a pivotal connection between the members which permits one of them to be adjusted laterally, adjusting-means between the members, a transversely tiltable bearing in the housing, means for adjusting the housing, and an adjustable pivotal connection between the beam and said bearing.

FRANK E. DAVIS.
WILLIAM W. CAMERON.

Witnesses:
C. W. Levis,
W. P. Roellig.

Copies of this patent may be obtained for five cents each, by addressing the "Commissioner of Patents, Washington, D. C."